May 2, 1967
E. E. JAFFE
3,317,539
BETA PHASE OF 2,9-DIMETHOXYQUINACRIDONE
Filed Aug. 20, 1965
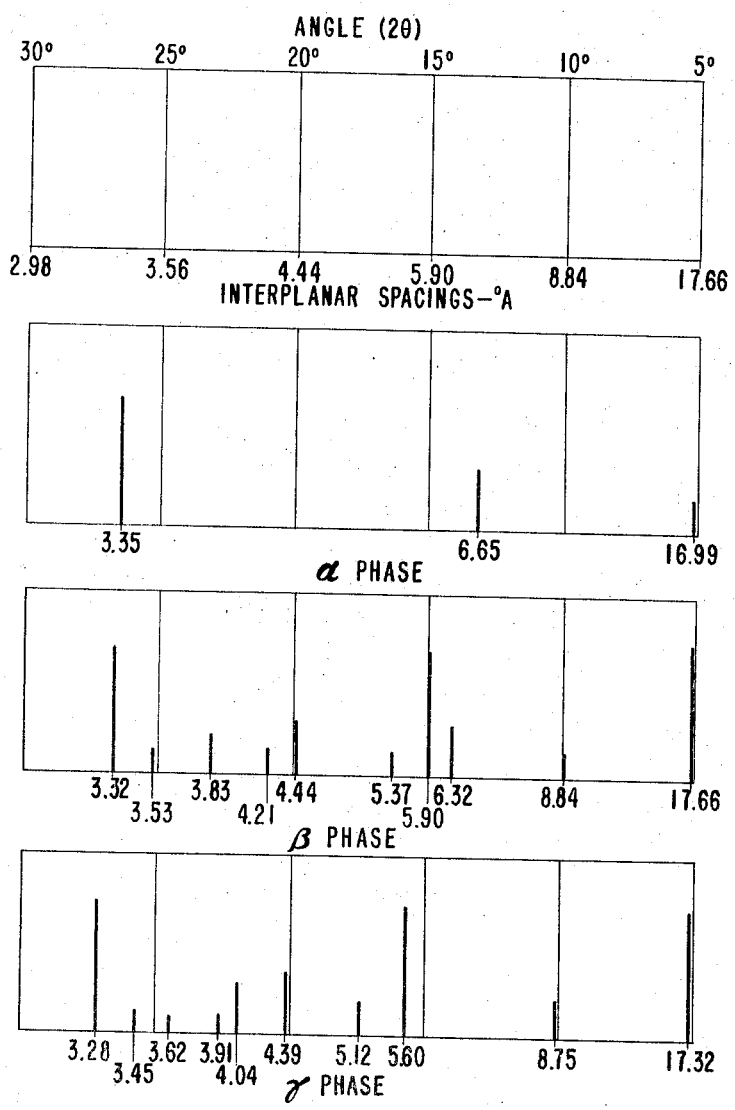
INVENTOR
EDWARD E. JAFFE
BY
ATTORNEY

United States Patent Office 3,317,539
Patented May 2, 1967

3,317,539
BETA PHASE OF 2,9-DIMETHOXYQUINACRIDONE
Edward E. Jaffe, Union, N.J., assignor to E. I. du Pont de Nemours and Company, Wilmington, Del., a corporation of Delaware
Filed Aug. 20, 1965, Ser. No. 481,209
1 Claim. (Cl. 260—279)

This invention relates to new pigment compositions, more particularly to new violet-colored pigments in the quinacridone series, and still more particularly to a novel, beta polymorphic modification of 2,9-dimethoxyquinacridone and to processes for making it.

In the drawing there is shown a graphic representation of the X-ray diffraction pattern of the novel beta-phase 2,9-dimethoxyquinacridone in comparison with the corresponding patterns for the alpha and gamma phases.

It has now been found that 2,9-dimethoxyquinacridone can exist in three polymorphic modifications which are distinguishable by their X-ray diffraction patterns, some differences in color, and pronounced differences in stability to the action of various organic liquids. One of these polymorphic modifications, which is more fully described hereinafter as the beta form and can be made by a process herein described, is a novel crystalline form which exhibits a pleasing, intense violet shade, good tinctorial strength, and excellent lightfastness. It resembles the beta phase of unsubstituted quinacridone in hue, but is considerably more intense and has high utility in blends with less costly red pigments to give intense red coating compositions of high lightfastness.

The novel pigmentary beta-phase 2,9-dimethoxyquinacridone can be made according to this invention by a process comprising the steps of (1) mixing a water-soluble salt with a 2,9-dimethoxyquinacridone of a phase other than beta, in the proportion by weight of about from 4 to 10 parts of salt per part of the 2,9-dimethoxyquinacridone, (2) milling such mixture under attrition, (3) adding to the mixture enough of an organic solvent selected from the group consisting of glacial acetic acid, chloroacetic acid, propionic acid, methanol, ethanol, propanol and ethylene glycol to give a fluid slurry, (4) boiling the resultant slurry, and (5) recovering beta-phase 2,9-dimethoxyquinacridone as a finely divided solid of pigment particle size from said mixture.

Beta-phase 2,9-dimethoxyquinacridone is a reddish violet pigment of exceptional lightfastness which is stable to solvents in all of the usual applications in coating compositions. Under certain extreme conditions, such as boiling with dimethyl formamide (and similar high boiling liquids of high solvency power) the product may be transformed to the gamma phase. The reddish violet hue is similar to that of the beta phase of unsubstituted quinacridone, but the new product exhibits considerably greater intensity. It thereby exhibits special utility in blends with less costly red pigments, such as molybdate orange (a lead chromate-lead molybdate solid solution), in the preparation of intense red coating compositions of excellent durability.

The 2,9-dimethoxyquinacridone from which the new beta phase is developed can be prepared by any desired method of synthesis. Many methods of synthesis of quinacridones are shown in the art, but they all fall into one of two categories:

(1) Cyclization of a dialkyl diarylaminodihydroterephthalate under the influence of heat while suspended in an inert high boiling liquid, followed by oxidation of the resulting dihydroquinacridone.

(2) Cyclization of a 2,5-diarylaminoterephthalic acid (or its ester) by heating with a strongly acidic dehydrating agent such as polyphosphoric acid, sulfuric acid, $AlCl_3$ in an inert solvent, and the like.

As shown in Example 1b, the first of these processes usually results in the gamma phase in crude form. It is possible, however, to alter the conditions (high water-low alcohol-high alkali content) so that a predominance of alpha phase is obtained. The second process always froms an acid salt of the pigment which must be regenerated by dilution with water, invariably forming the product in a predominantly alpha form.

It has now been found that there is interconvertibility between the three phases. A common intermediate, which can be prepared from any one of the three phases, is a mill powder containing up to about 10 parts of sodium chloride per part of 2,9-dimethoxyquinacridone. This can be made by dry-milling in a ball mill 1 part of 2,9-dimethoxyquinacridone from any convenient source with 4 to 10 parts of sodium chloride. The beta-phase pigment can be recovered therefrom as follows:

(1) Treatment by boiling with glacial acetic acid as in Example 1e. Appropriate and useful modifications of such a process are shown in Example 1e. In addition to glacial acetic acid and ethanol, one may use methanol, propranol, ethylene glycol and the like as well as chloracetic acid, propionic acid and the like.

(2) If the milling is carried out in the presence of certain selected liquids such as tetrachloroethylene, as shown in Example 2, and particularly when the salt used is hydrated aluminum sulfate, the beta phase is obtained directly in the ball mill. Other liquids useful in this method includes xylene, o-dichlorobenzene, and the like. This method is substantially independent of the phase of the starting material, although there appears to be some tendency for the crude gamma phase product of Example 1c to resist complete phase change to the beta phase in this method, with the result that the products tend to be bluer than those of Example 2.

Solution of any phase in concentrated sulfuric acid, polyphosphoric acid or the like, followed by regenerating the pigment by dilution with water always gives the unstable alpha phase.

Treatment of the unstable alpha phase with a high potency solvent such as dimethyl formamide at the boil converts it back to the gamma phase. Under such extreme conditions, the beta phase also tends to revert to the gamma phase.

These interchanges lead to the conclusion that the alpha phase is the least stable and the gamma phase the most stable of the three modifications of 2,9-dimethoxyquinacridone. The beta phase approaches but does not quite equal the gamma phase in stability. However, it is completely stable under normal conditions of use as a pigment. The considerably more reddish-violet hue in comparison to the gamma phase gives the beta phase a special and unexpected utility.

The beta phase of 2,9-dimethoxyquinacridone is useful as a pigment which offers a highly useful combination of a reddish-violet hue and high light stability. It is similar in hue to the known beta phase of unsubstituted quinacridone, but is remarkably brighter or more intense and noticeably more lightfast when compared with this beta quinacridone already noted for its high lightfastness. The improved intensity offers a pronounced advantage for use in admixture with less costly red pigments to obtain highly useful bright red coating compositions of good durability.

The beta phase of 2,9-dimethoxyquinacridone is useful in coating compositions of the widest variety. Its extremely low solubility, high intensity and high lightfastness give it great versatility. Thus, it is useful for coloring paints, printing inks, linoleum, rubber, plastics of various kinds, for textile printing and the like.

The characterization of the three phases of 2,9-dimethoxyquinacridone is based upon X-ray diffraction patterns of the three products. The X-ray patterns can be obtained by the well-known powder technique using a Geiger counter to record the intensity of the diffracted rays. The instrument records the intensity of the diffracted ray on the vertical axis of a recording paper versus the angle of diffraction on the horizontal axis. The patterns, as recorded, were made with Cu K alpha radiations and have been recorded as diffraction angles ($2\theta$) which have also been converted to interplanar spacings expressed in angstrom units (A.) using standard tables for this conversion. Interplanar spacings represent actual measurements (independent of instrument variations) of the arrangement of the molecular layers in the crystal. The values given are accurate to within 2% or less. Cognizance of this possible variation should be taken when interpreting the specification and claims.

For a further understanding of the invention and particularly the relation between the phases the following tables summarize the patterns for each of the phases:

TABLE I.—(ALPHA PHASE)

| Angle $2\theta$, degrees | Interplanar Spacings, A. | Intensity |
| --- | --- | --- |
| 5.2 | 16.99 | Weak, diffuse. |
| 13.3 | 6.05 | Strong, fairly sharp. |
| 26.6 | 3.35 | Medium, fairly sharp. |

TABLE II.—(BETA PHASE)

| Angle $2\theta$, degrees | Interplanar Spacings, A. | Intensity |
| --- | --- | --- |
| 5.0 | 17.66 | Strong. |
| 10.0 | 8.84 | Weak. |
| 14.0 | 6.32 | Do. |
| 15.0 | 5.90 | Strong. |
| 16.5 | 5.37 | Weak. |
| 20.0 | 4.44 | Do. |
| 21.1 | 4.21 | Do. |
| 23.2 | 3.83 | Do. |
| 25.2 | 3.53 | Do. |
| 26.8 | 3.32 | Strong. |

TABLE III.—(GAMMA PHASE)

| Angle $2\theta$, degrees | Interplanar Spacings, A. | Intensity |
| --- | --- | --- |
| 5.1 | 17.32 | Strong. |
| 10.1 | 8.75 | Weak. |
| 15.8 | 5.60 | Strong. |
| 17.3 | 5.12 | Weak. |
| 20.2 | 4.39 | Medium. |
| 22.0 | 4.04 | Do. |
| 22.7 | 3.91 | Weak. |
| 24.6 | 3.62 | Do. |
| 25.8 | 3.45 | Do. |
| 27.2 | 3.28 | Strong. |

The drawing shows these patterns in graphic form. The horizontal axis is a linear representation of the angle of diffraction ($2\theta$). Interplanar spacings corresponding to the 5° intervals and to the specific lines are shown. The vertical lines represent an estimation of the relative intensities of the diffraction lines.

The invention will be better understood by reference to the following illustrative examples.

EXAMPLE 1

(a) *Preparation of diethyl 2,5-bis(p-anisidino-3,6-dihydroterephthalate*

To a vessel equipped with a reflux condenser, an agitator, and a means for maintaining an inert atmosphere, is charged 256 parts (1 mol) of diethyl succinylsuccinate. After introducing an inert atmosphere of nitrogen which is then maintained throughout subsequent steps, 4000 parts of denatured ethanol (Formula 2B) is added and the liquid heated under reflux (external heating) until the solid has dissolved. Then 369 parts (3 mols) of p-anisidine is added, followed by 35 parts of concentrated HCl. The reaction mixture is then heated to the boil and maintained at the boil under reflux for 3 hours.

After cooling, the charge is filtered, washed with alcohol, and reslurried in 300 parts of water to which 36 parts sodium carbonate in 250 parts water is added. The mixture so obtained is stirred for 10–15 minutes to neutralize the aniline hydrochloride catalyst. The solid is again filtered from the slurry, washed first with ethanol and then with water until free of chlorides, and dried at 60° C. to give 457 parts of a light colored solid (98.0% yield).

After recrystallization from ethanol the melting point was in the range of 190 to 191° C. Upon analysis, the following results were obtained:

*Analysis.*—Calcuated for $C_{20}H_{30}N_2O_6$: C, 67.0%; H, 6.44%; N, 6.00%. Found: C, 66.38%; H, 6.64%; N, 5.84%.

(b) *Preparation of 2,9-dimethoxy-6,13-dihydroquinacridone*

In a suitable agitated vessel equipped with an agitator, a distilling column, and a means for maintaining an inert atmosphere therein there is placed 233 parts (0.5 mol) of the above-described diethyl 2,5-bis (p-anisidino)-3,6-dihydroterephthalate. 2850 parts of purified "Dowtherm A" (the eutectic mixture of 23.5% biphenyl and 76.5% diphenyl oxide) is added and the charge is blanketed with an inert nitrogen atmosphere which is maintained through the succeeding heating steps. The charge is heated slowly to the boil, and the heating rate adjusted so that a fraction boiling at about 80–85° is taken off (this is the ethyl alcohol resulting from the cyclization). Heating at the reflux is continued for about 4 hours, and the resulting suspension is cooled, filtered and washed on the funnel with alcohol. After drying, 131 parts of light brown 2,9-dimethoxy-6,13-dihydroquinacridone is obtained.

*Analysis.*—Calculated for $C_{22}H_{18}N_2O_4$: N, 7.48%. Found: N, 7.48%.

(c) *Oxidation to gamma-phase 2,9-dimethoxyquinacridone*

Into a closed agitated vessel equipped with a reflux condenser is charged 106.5 parts (0.285 mols) of the above-described 2,9-dimethoxy-6,13-dihydroquinacridone, together with 1600 parts of ethanol (Formula 2B). A solution of 340 parts (6.07 mols) potassium hydroxide in 340 parts of water is added and the mixture stirred at room temperature for 15 minutes, after which 106.5 parts (0.473 mol) of nitrobenzene-m-sodium sulfonate is added. The agitated mixture is heated to the boil and kept under reflux for about 4 hours. It is then diluted with a large excess of cold water, and the solid is isolated by filtering, washing with water until alkali free, and drying at 80° C.

There is obtained 97.3 parts (91.8% yield) of a violet colored pigment, 2,9-dimethoxyquinacridone. This crude product exhibits an X-ray diffraction pattern with three strong lines at diffraction angles ($2\theta$) of 5.1°, 15.8° and 27.2°, two lines of medium intensity with $2\theta$ values of 20.2° and 22.0°, and five lines of lesser intensity with $2\theta$ values of 10.1°, 17.3°, 22.7°, 24.6° and 25.8°. This phase is designated the gamma phase. It is a crude pigment in relatively large particle size, but it is a relatively stable phase and not generally changed by exposure to powerful solvents such as dimethyl formamide.

As obtained by the above procedures, this product is in relatively large particle size which requires reduction for most pigment uses. This can be accomplished in convenient manner without disturbing the crystal phase by milling, under conditions of high shear and impact, a mixture of the pigment and a finely divided inorganic salt such as borax while suspended in a saturated solution of the salt as more fully described in U.S. 2,816,114.

(d) *Purification of pigment and preparation of alpha phase*

One hundred parts of crude 2,9-dimethoxyquinacridone, such as made in (c), above, is pulverized and dissolved in 3000 parts of 96% $H_2SO_4$ maintained at 8–10 C.

When solution is complete, about 200 parts of water is added slowly to reduce the acid concentration to 90%, whereupon a crystalline solid precipitates from solution. It is filtered, washed with 85% $H_2SO_4$, and then introduced into a large volume of ice and water to regenerate the pigment which is finally filtered, washed free of acid and dried to give 91.5 parts of a bluish-red pigment.

Upon examination by X-ray diffraction, the acid crystallized product is shown to be a phase, different from the gamma phase above described, with a very diffuse X-ray diffraction pattern showing a broad weak band at about 5.2° $2\theta$, a stronger band at about 13.3° $2\theta$ and a fairly sharp band of medium strength at 22.6° $2\theta$. It is called the alpha phase by reason of the resemblance in the method of preparation to that of the alpha phase of quinacridone (see U.S. 2,844,484). It is a bluish violet pigment of good strength and excellent intensity, but it is readily converted, by exposure to strong solvents such as dimethyl formamide, to the gamma form.

The same alpha form, but in a smaller particle size, is obtained when the acid solution is rapidly diluted with a large volume of water. A similar product is also obtained when the crude gamma phase is milled with several times its weight of salt and the salt extracted with water or diluted acid.

For purposes of analysis, the acid-crystallized product is further purified by extraction with boiling dimethyl formamide (thus converting it back to the gamma phase in large particle size). The analysis of this product shows 7.51% nitrogen vs. 7.53% calculated for $C_{22}H_{16}N_2O_4$.

(e) Beta phase

One hundred parts of crude gamma phase 2,9-dimethoxyquinacridone (as from c above) and 1000 parts of sodium chloride are added to a ball mill of appropriate size charged with grinding elements such as ½" steel balls or ½" x 1" steel rods ("CYL-PEBS"). The mill is then rotated for about 48 hours, and the powder discharged. A portion of this powder is boiled for 2 hours with sufficient glacial acetic acid to give a fluid slurry. It is then diluted with a large volume of water, filtered, washed acid-free, and dried.

The resulting product is an intense violet pigment of good strength and excellent lightfastness. Upon examination by X-ray, it exhibits a new diffraction pattern with three strong lines at $2\theta$ angles of 5.0°, 15.0° and 26.8° and seven lines of less intensity at $2\theta$ angles of 10.0°, 14.0°, 16.5°, 20.0°, 21.1°, 23.2° and 25.2°. This product is now called the beta phase.

If the glacial acetic acid in this process is replaced by an equal volume of ethanol, other steps being alike, the same beta phase product is obtained.

In an alternative procedure, the salt milled powder is added to an aromatic hydrocarbon solvent, such as xylene, or a chlorinated aromatic solvent, such as o-dichlorobenzene, the volume of the solvent being sufficient to give a fluid slurry, and the agitated slurry is heated under reflux for about 2 hours. It is then filtered and the solvent removed by washing with alcohol. The cake is reslurried in a large volume of hot water, slightly acidified, stirred, filtered, washed free of soluble salts and dried to give a similar beta phase product. In a modification of this procedure, after heating with the aromatic solvent, the slurry is diluted with water and the solvent removed by steam distillation after which the slurry is filtered, washed and dried.

EXAMPLE 2

Beta phase by direct milling

Fifteen (15) parts of acid-crystallized 2,9-dimethoxyquinacridone (alpha phase from Example 1d) and 135 parts of crystalline aluminum sulfate ($Al_2(SO_4)_3 \cdot 18H_2O$) are charged to a ball mill of suitable capacity containing a mixture of 1500 parts ¼" steel balls and 150 parts roofing nails. Four (4) parts of tetrachloroethylene is added to the mill. The mill is then rotated at 70-80% of critical speed (the speed at which centrifugal force just holds the charge against the periphery of the mill) for about 3 days. After separation from the grinding elements, the powder is added to about 1500 parts of a 2-3% solution of $H_2SO_4$, boiled about 30 minutes, filtered, washed free of soluble salts and dried. The product exhibits the X-ray diffraction pattern of the beta phase, together with high tinctorial strength.

EXAMPLE 3

Intense red coating compositions using various quinacridone pigments

Two separate lacquer grinds are made as follows:

A. To a ball mill of appropriate size, containing 2000 parts of ³⁄₁₆" steel balls, is added:

| | Parts by weight |
|---|---|
| Molybdate orange pigment | 450 |
| Acrylic resin vehicle (30% solids) | 150 |
| Toluene | 50 |
| Methylethyl ketone | 30 |
| Monomethyl ether of ethylene glycol monoacetate | 20 |

This mixture is milled in a conventional manner for four hours. Then 200 parts of acrylic resin vehicle is added to the mill, and the mill is then rotated long enough to thoroughly mix the contents (4 to 10 minutes). Thereafter the mill base is separated from the balls. One hundred parts of this mill base is then mixed with 794 parts of acrylic resin vehicle to give a finished lacquer with 5.59% pigment and a pigment/vehicle ratio of 20/100.

B. To a ball mill of suitable size containing 400 parts of steel balls, is added:

| | Parts by weight |
|---|---|
| Quinacridone pigment | 10 |
| Acrylic resin vehicle (30% solids) | 33 |
| Toluene | 28.5 |
| Methylethyl ketone | 17.1 |
| Monomethyl ether of ethylene glycol monoacetate | 11.4 |

This mixture is milled in a conventional manner for 48 hours. Then 94 parts of acrylic resin vehicle is added to the mill, and the mill is rotated for 10 to 30 minutes to thoroughly mix the contents followed by an additional portion of 206 parts acrylic resin vehicle after which the lacquer is separated from the balls. It contains 2.5% pigment with a pigment/binder ratio or 10/100.

C. To make intense red coating compositions of high lightfastness, the above lacquers are mixed in the ratio of 20 parts lacquer B and 170 parts lacquer A to give a final red lacquer incorporating the quinacridone pigment and the molybdate orange in the ratio of 5 parts violet to 95 parts molybdate orange.

For comparative purposes, the following pigments may be used in lacquers made as in lacquer B and then incorporated in intense red coating compositions:

B₁—beta phase 2,9-dimethoxyquinacridone of Example 1e,
B₂—beta phase quinacridone of U.S. 2,844,485,
B₃—gamma phase 2,9-dimethoxyquinacridone of Example 1c, after particle size reduction.

The intense red coating compositions, C, made therefrom are designated as follows:

C₁—from lacquer B₁,
C₂—from lacquer B₂,
C₃—from lacquer B₃.

The following table compares the tinctorial properties of the three final lacquers:

C₁ vs. C₃ slightly yellow, much more intense,
C₁ vs. C₃ light and intense,
C₃ vs. C₂ dark and dull.

Whereas the gamma phase of 2,9-dimethoxyquinacridone gives a mixture with molybdate orange which is dark and dull when compared to a similar mixture from the prior art beta phase unsubstituted quinacridone, the beta phase of 2,9-dimethoxyquinacridone gives a mixture which is unexpectedly much more intense than is obtained from the prior art product.

EXAMPLE 4

In another comparison of the tinctorial properties of these pigments, the quinacridone lacquers $B_1$, $B_2$ and $B_3$ from Example 3 are tinted with titanium dioxide pigment by mixing the quinacridone lacquers with appropriate amounts of a previously prepared $TiO_2$ lacquer to give a final lacquer containing quinacridone pigment and $TiO_2$ in the ratio 5/95. Thus, 31.6 parts of a quinacridone lacquer (2.5% pigment) is mixed with 100 parts of a typical $TiO_2$ lacquer containing 15% $TiO_2$, and tints are made from the three quinacridone lacquers of Example 3–B as follows:

D—beta phase 2,9-dimethoxyquinacridone of Example 1e,
E—beta phase of quinacridone of U.S. 2,844,485,
F—gamma phase 2,9-dimethoxyquinacridone of Example 1c, after particle size reduction.

The tinctorial properties of these products compare as follows:

D vs. E slightly blue—very intense,
D vs. F yellow and intense,
F vs. E very blue, slightly intense.

The beta phase of 2,9-dimethoxyquinacridone is thus much more intense than the prior art commercial beta phase of unsubstituted quinacridone. It is also somewhat more intense and much yellower than the gamma phase of 2,9-dimethoxyquinacridone.

I claim:

A reddish-violet pigment of high intensity and high lightfastness consisting essentially of the beta phase of 2,9-dimethoxyquinacridone characterized by an X-ray diffraction pattern exhibiting three strong lines as follows:

| $2\theta$ angle of diffraction—degrees: | Interplanar spacing—A. |
|---|---|
| 5.0 | 17.66 |
| 15.0 | 5.90 |
| 26.8 | 3.32 | and seven lines of lesser intensity as follows:

| $2\theta$ angle of diffraction—degrees: | Interplanar spacing—A. |
|---|---|
| 10.0 | 8.84 |
| 14.0 | 6.32 |
| 16.5 | 5.37 |
| 20.0 | 4.44 |
| 21.1 | 4.21 |
| 23.2 | 3.58 |
| 25.2 | 3.53 |

No references cited.

ALEX MAZEL, *Primary Examiner.*

DONALD G. DAUS, *Assistant Examiner.*

UNITED STATES PATENT OFFICE
CERTIFICATE OF CORRECTION

Patent No. 3,317,539　　　　　　　　　　　　　　　　May 2, 1967

Edward E. Jaffe

It is hereby certified that error appears in the above numbered patent requiring correction and that the said Letters Patent should read as corrected below.

Column 8, line 26, for "3.58" read -- 3.83 --.

Signed and sealed this 12th day of November 1968.

(SEAL)
Attest:

Edward M. Fletcher, Jr.　　　　　　　　　　　EDWARD J. BRENNER
Attesting Officer　　　　　　　　　　　　　　Commissioner of Patents